United States Patent [19]

Kahara et al.

[11] Patent Number: 4,810,595
[45] Date of Patent: Mar. 7, 1989

[54] MOLTEN CARBONATE FUEL CELL, AND ITS OPERATION CONTROL METHOD

[75] Inventors: Toshiki Kahara, Ibaraki; Masato Takeuchi, Katsuta; Hideo Okada, Hitachi; Kazuo Iwamoto, Hitachi; Yoshio Iwase, Hitachi; Kouichi Mitsugi, Hitachi, all of Japan

[73] Assignee: New Energy Development Organization, Tokyo, Japan

[21] Appl. No.: 141,646

[22] Filed: Jan. 6, 1988

[30] Foreign Application Priority Data

Jan. 9, 1987 [JP] Japan .................. 62-1624
Jan. 9, 1987 [JP] Japan .................. 62-1625

[51] Int. Cl.$^4$ .............................. H01M 8/14
[52] U.S. Cl. ..................... 429/16; 429/19; 429/23; 429/25
[58] Field of Search ............ 429/16, 19, 23-25

[56] References Cited

U.S. PATENT DOCUMENTS 3,331,703 7/1967 Young ..................... 429/22
3,879,218 4/1975 Kellen et al. ............ 429/22
4,309,359 1/1982 Pinto ..................... 429/16 X Primary Examiner—Anthony Skapars
Attorney, Agent, or Firm—Pennie & Edmonds

[57] ABSTRACT

A molten carbonate fuel cell using molten carbonate as an electrolyte, carbonate ions as electric conductor, and feeding a hydrogen-enriched gas to the anode and a mixture of air and carbon dioxide gas to the cathode has its output fall by degrees with operation. It is surmised that one of the causes of this problem is ascribable to the fact that the molten carbonate electrolyte moves during operation to destroy equilibrium in the boundary between the electrolyte and electrodes. After studies for measures against the problem, the inventor found that the output of a fuel cell which has fallen can be improved by shutting off part or all of the reaction gases or reducing their feed for a while, and then restoring. The purpose of the present invention is to offer a high-performance stable-output molten carbonate fuel cell and its operation control method, incorporating the above findings in its operation control system.

8 Claims, 3 Drawing Sheets

MOLTEN CARBONATE FUEL CELL, AND ITS OPERATION CONTROL METHOD

FIELD OF THE INVENTION

The present invention relates to a fuel cell using a molten carbonate as an electrolyte, and more specifically to a molten carbonate fuel cell equipped with a means of control that can optimize the operation of the fuel cell so that it will maintain output performance integrity stably over an extended period, as well as to a process realizing such control.

DESCRIPTION OF PRIOR ART

The molten carbonate fuel cell uses an alkali metal carbonate as an electrolyte, and works by feeding hydrogen-enriched gas to the anode and a mixture of air and carbon dioxide gas to the cathode, at the temperature of 600° to 700° C., liberating carbonate ions ($CO_3^{2-}$) as electric conductor.

This fuel cell is basically composed of a substrate holding said electrolyte on it, an anode electrode (fuel electrode) on one side of said substrate, a cathode electrode (oxidizer electrode) on another, a fuel gas chamber installed outside of said anode electrode and an oxidizer gas chamber outside of said anode electrode. The output voltage per unit cell is about 0.8 V. By stacking a number of these cells in layers, a required voltage can be obtained. As the temperature of each cell rises due primarily to Joule's heat, a heat sink is inserted for every several layers to keep the cell temperature constant. To realize a large-output fuel cell, the electrode surface areas are maximized to be capable of flowing a large current.

The fuel cell is a dc generator in which fuel gases and oxidizing gas are supplied to respective chamber referred to above for converting chemical energy into electrical energy at a high efficiency through electrochemical reaction. In the molten carbonate fuel cell, hydrogen ($H_2$) and/or a gas containing carbon monoxide (CO) is used as a fuel gas, while a gas containing oxygen ($O_2$) and carbon dioxide ($CO_2$) is used as an oxidizing gas. These gases develop the following electrochemical reaction to generate a dc current.

$$2H_2 + 2CO_3^{2-} \rightarrow 2CO_2 + 2H_2O + 4e \quad (1)$$

$$2CO_2 + O_2 + 4e \rightarrow 2CO_3^{2-} \quad (2)$$

It is considered that the electrochemical reaction above takes place in a three-phase boundary where electrolyte and reaction gases coexist on the electrode surfaces. It is evident that if the reaction above takes place smoothly at a sufficient speed, the fuel cell can exhibit high performance, and that a field of reaction called the three-phase boundary must be provided sufficiently. Namely, it is necessary that the electrodes are provided with a large specific surface area and wetted properly with electrolyte, and that they have pores of proper size for efficient diffusion of reaction gases. In the case of phosphoric acid fuel cell, for example, water repellency control, pore control, etc. are available for the purpose of ensuring a sufficient field of reaction. In the water repellency control, the level of a water repellent like polytetrafluoroethylene in the electrode catalyst is controlled to control the wetting of electrodes with phosphoric acid.

For the molten salt type fuel cell, however, there is no proper material equivalent in function to water repellent. The only way available for the control of the characteristics of cell materials is to control pores. As reported in "Development of Molten Carbonate Fuel Cells for Power Generation (Apr., 1980, U.S. Department of Energy)," the electrolyte substrate pores are smaller by a factor of about 1 than the pores in the electrodes; the pores in the electrolyte substrate are less than 1 $\mu$m on the average while those in the electrodes are in the range of 3 to 10 $\mu$m. Thus, the electrolyte retentivity of the substrate is greater than that of the electrodes, preventing the electrolyte from wetting electrodes excessively and from blocking electrode pores to impair gas permeation.

On the other hand, this feature blocks the electrolyte from moving toward electrode surfaces, making the wetting of electrode surfaces with electrolyte insufficient and thus making the field of electrochemical reaction insufficient and increasing the ion diffusion resistance.

There is another control method in which anode and cathode electrodes are impregnated with electrolyte to the extent the field of electrochemical reaction will be optimized to elicit the highest performance and longest service life from a cell while preventing the evil effect of electrolyte storage in the electrode pores upon gas diffusion.

Although there are various methods which have been tried for the purpose of improving the performance and service life of molten salt fuel cells, there are many factors, including cell setting-up accuracy and operating methods, that govern the performance of cells. It is often the case that it takes a long time for a cell to attain a rated output from start. A change of pore characteristics of electrolyte substrates and electrodes causes a change in the distribution of electrolyte after a long period of operation, narrowing the field of electrochemical reaction and deteriorating the battery performance as a whole. The prior proposed methods of increasing fuel cell service life include: a gas pressure control method in which the pressure of both fuel and oxidizing gases is increased with increase in load and decreased with decrease in load (Laying-Open No. 1985-10566), a polarity transposition method in which a cell is operated once or more with anode and cathode transposed by interchanging active substances fed to them (Laying-Open No. 1985-189177), and an electrolyte-laden gas feed method in which evaporation and diffusion of electrolyte are controlled by feeding electrolyte-laden gases to the anode and cathode (Laying-Open No. 1986-24166).

While these proposed methods represent the consummation of refinements in engineering materials used for making a block of cells or a stack of blocks, they leave much to be desired from the viewpoint of operation and control necessary for maintaining the performance integrity of each cell. Namely, none of the conventional methods offers a viable way of controlling the cell externally to maintain its performance from deteriorating.

Typical methods employed for improving cell performance include the reaction gas pressure control method, cell operating temperature control method and reaction gas partial pressure control method. In the reaction gas pressure control method, the differential pressure between anode and cathode is limited by the critical bubble pressure in excess of which it will cause a gas crossover phenomenon to break down the cell.

The differential pressure between anode and/or cathode on the one hand and the belljar internal pressure cannot be increased so much. This is because if said differential pressure is too high, reaction gases will break through the seal to reduce the availability of reaction gases and the power generation efficiency, accordingly, and also because the breakdown of gas seal will allow a purge gas into the cell to reduce the partial pressure of the reaction gases to deteriorate the cell performance.

The cell operating temperature control method is based on the phenomenon that a rise of cell operating temperature brings about an increase in the diffusion rate of electrolytic ions and reaction gases, reducing the cell specific resistivity, changing the wettability of electrodes with electrolyte, changing the electrode/electrolyte boundary conditions and in most cases to bring about an increase in the electrochemical reaction rate. But if the cell temperature is too high, the corrosion of cell components, the creeping or sintering of electrodes and the evaporation of electrolyte are accelerated, shortening the life of the cell.

In the reaction gas partial pressure control method, the cell performance can be enhanced by increasing the partial pressure of $H_2$ and/or CO in the fuel gases and of $O_2$ and/or $CO_2$ in the oxidizing gas. But it is very difficult to arbitrarily control the partial pressure of reaction gases, particularly with the molten salt type fuel cell for power generation which is a combination of a steam reformer or coal gasification unit and a fuel cell. Although the partial pressure of reaction gases can be increased by lowering the partial pressure of steam through gas-liquid separation, it has a limit because the precipitation of carbon within the cell must be prevented. In a commercial large-capacity power plant, it is not practical to install an $H_2$ source, $O_2$ source and $CO_2$ source independently, besides steam reformer and coal gasification unit.

As described above, none of the reaction gas pressure control method, cell temperature control method, reaction gas partial pressure control method and other conventional methods can improve cell characteristics fundamentally. Although they improve cell performance temporarily by changing external factors, the restoration of external factors will lead at best to recrudescence, or if things go ill as is often the case, to damage upon the cell only to aggravate the situation.

SUMMARY OF THE INVENTION

The purpose of the present invention is to offer a molten salt fuel cell power generation plant equipped with a means that improves the characteristics of the fuel cell itself, and ensures high-performance stable output characteristics over an extended period, together with a method of controlling such a means, eliminating the drawbacks of the prior art.

In order to achieve the above purpose, it is necessary to provide a sufficient field of reaction within the electrodes as discussed earlier. More specifically, it is very important to optimize the status of electrolyte on the electrode surfaces and at the boundary between electrodes and electrolyte substrate.

The causes of a fuel cell's failure to display its performance or to sustain its output during operation are often ascribable to improper distribution of electrolyte, or localization of electrolyte at anode or cathode, or to non-uniform wetting of electrodes with electrolyte.

The inventors made various experiments of controlling the distribution status of electrolyte externally by simple means, in an attempt to improve cell characteristics, and discovered the following facts.

In case the output voltage of a molten carbonate fuel cell will not rise or fall with time, it can be increased by operating under load for a while with part or all of the reaction gases shut off or with the feed rate of reaction gases reduced. More specifically, this output voltage improvement is achieved by cutting off or reducing the feed of hydrogen-laden fuel gas to the anode for a while, or by cutting off or reducing the feed of oxidizing gas [$CO_2$-laden gas and/or air (or $O_2$)] to the cathode for a while, or by cutting off or reducing both fuel and oxidizing gases simultaneously for a while.

The present invention features a molten salt fuel cell power generation plant incorporating a control system based on the above findings which makes it possible to operate the plant stably at a high efficiency for an extended period, and also a unique method of operating said control system.

The effects of the gas feed control according to the present invention will be more clearly understood from the following detailed description.

Now let us consider a case where the feed of $H_2$ contained in the fuel gas for the anode is cut off or reduced. Then, the following reaction will take place at the anode.

$$2CO_3^{2-} \longrightarrow 2CO_2 + O_2 + 4e \qquad (3)$$

$$2CO_3^{2-} + 2M \longrightarrow 2CO_2 + 2MO + 4e \qquad (4)$$

(In Eq. (4), M denotes the metal used in the anode.)

The expressions above suggest that the cell system services as a so-called oxygen pump because $O_2$ generated at the anode is pumped at the cathode. It is also expected that an oxide film will be formed by the oxidation of the cell material M.

As the reaction at anode change from (1) and (2) to (3) and (4), the anode potential changes sharply to transfer electrolyte, improve the wetting of electrodes, expand the field of electrochemical reaction, and thus to improve the performance of the cell as a whole. The formation of oxide film also improves the wettability of electrodes to improve the field of electrochemical reaction.

At the cathode, the following reaction will take place when the feed of oxidizing gas (for example, $CO_2$) for the cathode is cut off or reduced.

$$4O_2 + 4e \longrightarrow 4O_2^- \qquad (5)$$

$$8MO + 4e \longrightarrow 8M + 4O_2^- \qquad (6)$$

Namely, the production of peroxide or superoxide by the ionization of $O_2$ or the reduction of electrode metal oxide, MO, progresses at the cathode. With the progress of reactions (5) and (6), the cathode potential changes to transfer the electrolyte, change the wetting of electrodes, and thus to improve the characteristics of the cell as a whole. The chemical conversion of cathode surface also changes the wetting of electrodes to increase the field of electrochemical reaction.

The inventors have already discovered with other types of fuel cells such as methanol/air fuel cell and phosphoric acid fuel cell that the wetting of electrodes with electrolyte can be changed by potential sweeping (an operation of swinging the potential one cycle or more) or by causing a potential difference. It is inferred that the electro-osmosis phenomenon is playing a major role in the control of electrode wetting. In the molten carbonate fuel cell associated with the present invention, partial or total shutoff or the throttling of the feed of reaction gases has worked more pronouncedly for the improvement of cell characteristics than the mere potential sweep or application of a potential difference.

It is to be said with all emphasis that the effect of the reaction gas feed control referred to above is even more amplified under a load condition, that is, when a block of fuel cells or a stack of blocks is carrying a load current. While the load current here is not limitative, the cell performance improvement effect becomes quite large when the load current is large, no matter how short the time of shutoff or reduction of reaction gas feed may be. For instance, when the cell is loaded forcibly with a current density of 150 mA/CM$^2$, the improvement effect takes place in a matter of one minute or so. At a current density of up to 50 mA/cm$^2$, it takes several minutes to several tens of minutes to bring about the same effect.

When the load current is zero, that is, when the current circuit is open, the effect of reaction gas feed control becomes minimal, but the effect can show itself if the reaction gas feed control is continued for a long time or if the reaction gases are shut off several times.

For the purpose of reaction gas feed control, the current was held constant, at first. It is possible to pass a current through the entire stack or through a selected block alone whose output characteristic has deteriorated.

But considering a large-area high-density stack, for example, the area is 10,000 cm$^2$, if the current density is set at 150 mA/cm$^2$, the current becomes no less than 1,500 A, calling for a large-capacity constant-current power supply. Consider another example that a stack consists of 40 cells by 15 blocks (or 600 cells in all). The control system for running a current through a selected block alone will become highly complex.

Without using such a constant-current load power supply, the inventor conducted a test to study the effect of reaction gas feed control on the cell characteristics under a normal load condition using a carbon resistor. For the test, a block of three cells with an electrode area of 900 cm$^2$ was used. When the cell voltage fell to 1.8 V at a current density of 150 mA/cm$^2$, the feed of H$_2$ gas to the anode was interrupted. No sooner had the H$_2$ gas been cut off than the cell voltage and current plunged sharply. Then, both the voltage and current leveled off. After 20 minutes, when the cell voltage rose to 0.7 V, and the current density to 50 mA/cm$^2$, the feed of H$_2$ was restarted. Both the cell voltage and current climbed suddenly; the cell voltage jumped to 2.1 V at a current density of 150 mA/cm$^2$. By repeating the same operation several times, the cell voltage rose to 2.3 V, regaining the original cell characteristics.

When the cell voltage, output, internal resistance, reaction gas pressure, differential pressure and/or other indicators of the output characteristics of a molten carbonate fuel cell power generation plant fall from their settings, or when the polarization value of its specific cell falls below the lower limit, a control system according to the present invention keeps, for a specified time, the feed of at least one of the fuel gases or the oxidizing gas lower than the corresponding electrochemical equivalent of the current flowing through the cell stack or block, and then restores it. This control system can keep the performance integrity of the output characteristics of the molten carbonate fuel cell power generation plant stably for an extended period.

BRIEF DESCRIPTION OF THE DRAWING

Referring to FIG. 1, the fuel cell 1 is shown to have 3 blocks of fuel cells. It is to be understood that the invention is not limited thereto or thereby, and that according to the present invention, said cell 1 may be in the form of a stack or any other number of blocks. 2 is a voltage detector part that detects the voltage of each block and compares with a specific value. 3 is a controller that switches anode and cathode gases and turns on and off the load circuit. Upon the signal from the voltage detector 2, the controller 3 sends a signal to the anode gas switch 4 and/or cathode gas switch 5 to select anode and/or cathode gases. At the same time, the load circuit switch 6 is switched to load 8 while the main load switch 7 is turned off. Part 9 is an inverter to convert dc current from the fuel cell to ac current for use for user loads.

When the voltage of any block has fallen below a setting value, the controller 3 signals the anode gas switch 4 to change the feed from hydrogen-enriched gas to nitrogen, and at the same time, the main load switch 7 is shut off, and the load circuit switch 6 is turned on instead. As a result, the fuel cell is forced to generate power on a hydrogen-lean gas. This state is held for an arbitrarily selected time of 1 to 15 minutes, and then the anode gas switch 4 is actuated to feed hydrogen-enriched gas to the fuel cell 1. When the performance of the fuel cell 1 is reinstated, the load circuit switch 6 is cut off, and the main load switch 7 is reclosed.

The same effect as above can be achieved by operating the cathode gas switch 5 to cut off the feed of carbon dioxide gas alone to the fuel cell or to cut off the feed of air alone, instead of carbon dioxide gas, to the fuel cell, other operations being the same as with the hydrogen gas feed control referred to above.

Which of the three modes described above should be selected can be determined by a computer built inside the controller 3 according to a control program in which the difference between the block voltage and setting value, and other various conditions are set for optimal control and operation of the fuel cell.

DETAILED DESCRIPTION OF PREFERRED EMBODIMENTS

Figure 1:
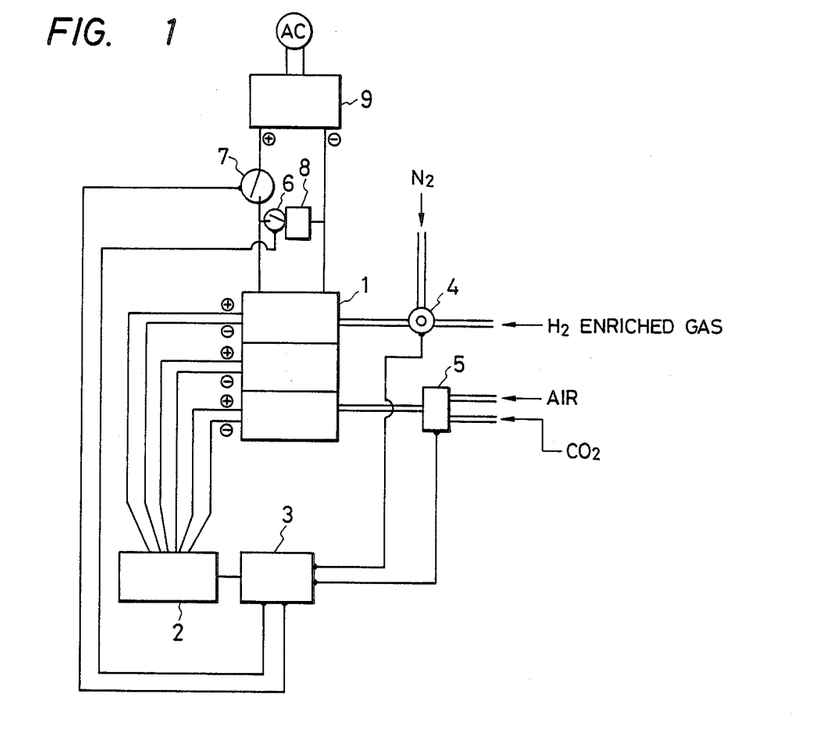
FIG. 1 is a schematic system of a molten carbonate fuel cell according to the present invention.

Preferred embodiment (1):

Preferred embodiment 1 of the present invention is explained below while referring to the schematic view of the molten carbonate fuel cell illustrated in FIG. 1. Anode and cathode electrodes were made of Ni and NiO porous plates, respectively, and the electrolyte substrate was made of a matrix of $LiAlO_2$ fine powder containing 20 wt. % of $Al_2O_3$ fibers and impregnated with a mixture of carbonates ($Li_2CO_3$ and $K_2CO_3$ mixed at a mole ratio of 62 to 38). 15 cells having an effective surface area of 100 $cm^2$ were laminated into an internal manifold type fuel cell. The cell was divided into 3 blocks each consisting of 5 cells, in order to measure the voltage of each block. The cell was put into a manifold, and was heated to 650° C. before power generation.

Gases obtained by reforming natural gas were fed to the anode, and a mixture of air and carbon dioxide gas (7:3 in volumetric ratio) was fed to the cathode. The fuel cell was clamped at a pressure of 3 kg/$cm^2$, and the current density set at 150 mA/$cm^2$.

Figure 2:
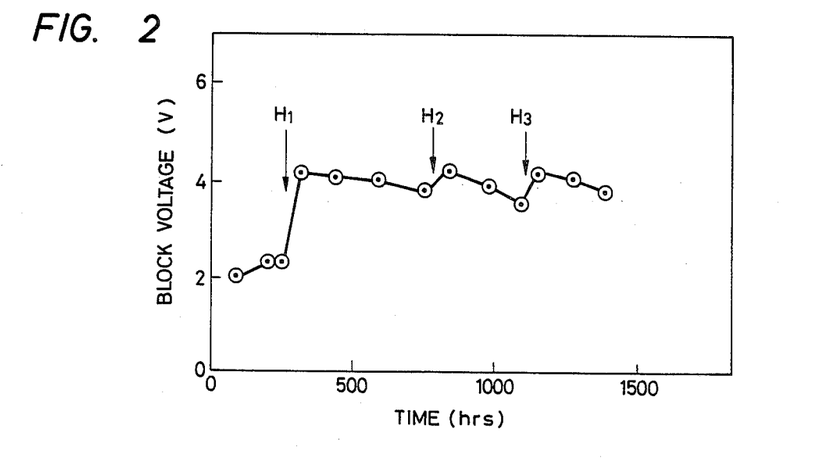
FIGS. 2, 3 and 4 show the transition of fuel cell block voltage when the reaction gases to be fed to anode and cathode are changed in operating the control system explained above, and correspond to the preferred embodiments 1, 2 and 3 of the present invention which will be discussed later.

By the power generation under the foregoing conditions, each block showed an output voltage of about 2 V as illustrated in FIG. 2.

The fuel cell was run for about 250 straight hours, but no significant voltage rise was noticed. Then, the feed gas to the anode was switched from hydrogen-enriched gas to nitrogen gas, and the fuel cell was run for about 10 minutes with the load circuit connected. The voltage of each block fell markedly. Following this, the anode gas was changed from nitrogen gas to hydrogen-enriched gas with the load connected. The output voltage of each block jumped to about 4 V as illustrated in FIG. 2. Referring to FIG. 2, the arrow mark $H_1$ shows the operation above. With time, the output voltage started to fall by degrees again. Again, the feed was switched from the hydrogen-enriched gas to nitrogen gas to repeat the reaction gas feed control operation explained above, and the output voltage was recovered again as indicated by the arrow mark $H_2$. A third reaction feed control point is indicated by the arrow mark $H_3$.

It was found that when the voltage of each block fell, that is, when the performance of the fuel cell deteriorated the battery performance could be improved pronouncedly by running the battery forcibly on an inert gas instead of the anode fuel gas.

Figure 3:
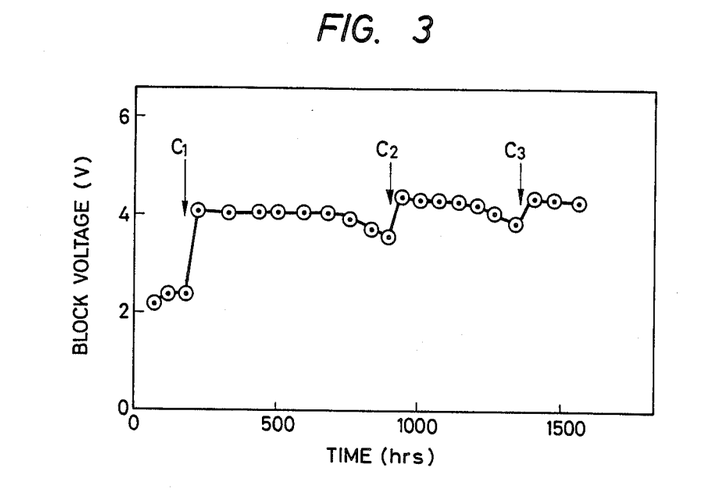

Preferred Embodiment (2):

The same fuel cell as used in the preferred embodiment (1) was prepared and operated at a current density of 150 mA/$cm^2$. The initial output voltage of each block was about 2.2 V. The generation operation was continued for some 150 hours. The block voltage rose to about 2.5 V. Of the cathode gases (air and carbon dioxide gas), the carbon dioxide gas alone was cut off, and the fuel cell was run for about 3 minutes with air alone supplied to the cathode. As soon as the carbon dioxide gas was cut off, the output voltage of each block plunged. Then, carbon dioxide gas was fed to the cathode again, and the block voltage rose sharply. FIG. 3 shows how the block voltage was changed by these reaction gas feed control operations. The arrow mark $C_1$ in FIG. 3 indicates the first reaction gas feed control referred to above. The operation of the fuel cell continued at 150 mA/$cm^2$, and the output voltage declined gradually. Here again, the same operations as above were repeated, and the block voltage was recovered again as indicated by the arrow mark $C_2$. Still further operation at 150 mA/$cm^2$ was followed by a third reaction gas feed control indicated by the arrow $C_3$.

Preferred Embodiment (3)

The same fuel cell as used in the preferred embodiment (1) was prepared and operated at a current density of 150 mA/$cm^2$. The initial output voltage of each block was about 2.2 V. The operation was continued for some 150 hours, and then the cell was run for about 3 minutes by feeding carbon dioxide gas alone to the cathode with the air shut off. As soon as the air was cut off, the output voltage of each block plunged.

Figure 4:
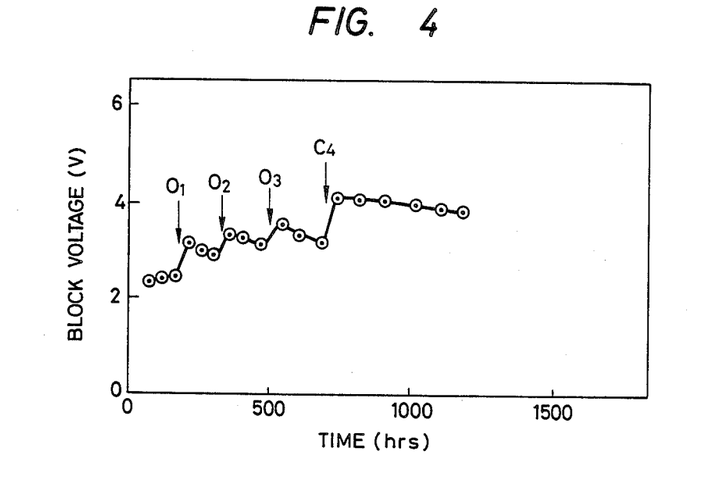

When the feed of air to the cathode was resumed with the load connected, the voltage of each block jumped to about 3.2 V, as indicated by the arrow $O_1$. When the block voltage fell during operating at a current density of 150 mA/$cm^2$, the same reaction gas feed control operations were repeated another two times as indicated by arrows $O_2$ and $O_3$ while continuing power generation. In each reaction feed control, the block voltage recovered. The maximum output voltage was about 3.7 V.

Following the same method as in the preferred embodiment (2), the carbon dioxide gas alone was interrupted for about 3 minutes, and then its feed to the cathode was resumed. As a result, the block voltage jumped in excess of 4 V as indicated by arrow $C_4$ in FIG. 4.

Preferred Embodiment (4)

Figure 5:
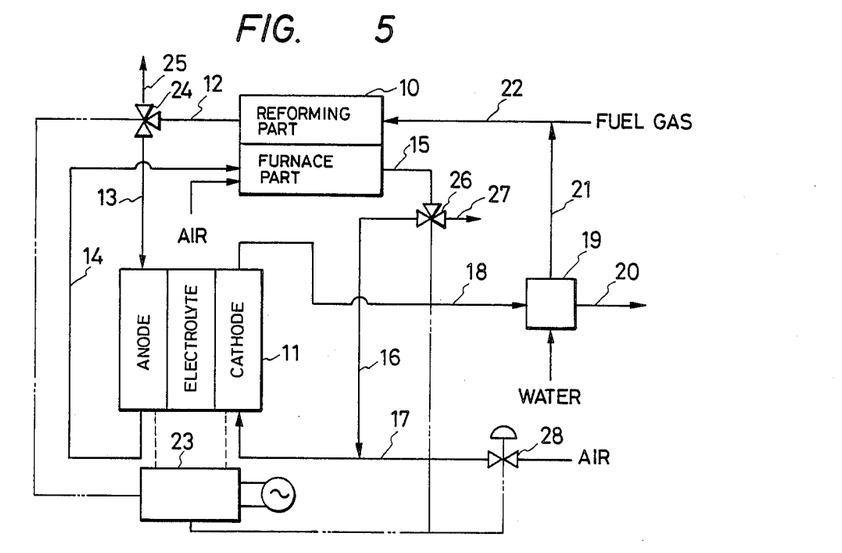
FIG. 5 is a schematic system diagram of a molten carbonate fuel cell power generation plant equipped with a steam reformer as a fuel gas producer.

FIG. 5 shows a molten carbonate fuel cell power generation plant using a steam reformer 10 as a fuel gas producer. Under normal generating operation, fuel gas is supplied to the anode of the fuel cell 11 from the steam reformer 10 via lines 12 and 13. On the other hand, the anode outlet gas from the fuel cell 11 is fed, together with a specified rate of air, to the furnace of the steam reformer 10 via the line 14, and is fired to heat the steam reformer. FIG. 5 shows a basic outline of a clean fuel cell power generation plant using a steam reformer. In case anode outlet gas alone is not enough as a heat source for the reformer, LNG is used as an auxiliary fuel. The waste gas containing carbon dioxide gas is fed from the furnace of the steam reformer 10 to the cathode of the fuel cell by way of lines 15, 16 and 17, and air is also fed to the cathode of the fuel cell 11 via line 17. The feed rates of these reaction gases are controlled depending on the load current requirement, reaction gas utilization factor and other power generation conditions. The cathode outlet gas from the fuel cell 11 is introduced via line 18 into the waste heat recovery unit 19 where it heats up water supplied to the unit 19 to generate steam. The cathode outlet gas then leaves the unit 19, and is exhausted to the open air by way of line 20. In the actual plant, it is often practiced to supply part of the cathode outlet gas into a compressor, and is recycled as a cooling gas for the fuel cell 11.

Usually, it is introduced into a turbine compressor for the compression of air or for power generation. In FIG. 5, however, these appurtenant energy-recovery systems are omitted. Usually, a waste heat recovery unit 19 is installed downstream of these energy-recovery systems. The steam generated in the waste heat recovery unit 19 is supplied to the steam reformer by way of lines 21 and 22. On the other hand, LNG as a material gas is mixed with steam at a specified ratio, and is supplied to the steam reformer 10 by way of line 22. Hydrogen-containing gas produced by the reforming of LNG through the steam reformer is supplied to the anode.

DC current generated by the fuel cell 11 is converted into AC current through the inverter 13, and is fed to the commercial power line.

Cell voltage, output power, and internal resistance are typical indicators of the output performance status of a fuel cell power generation plant. It is also possible to use the polarization value of a specific cell as an indicator. In this case, a comparison of anode with cathode polarization offers effective data upon which to determine whether fuel gas or oxidizing gas be reduced or shut off. The use of polarization value as an indicator has a drawback in that a great number of detection terminals are needed. Other indicators available include cathode pressure, anode pressure, differential pressure between anode and cathode, and the difference between the belljar internal pressure and reaction gas pressures.

Now assume that the cell voltage is selected as an indicator, and that 70% of the rated cell voltage is taken as a lower limit and memorized in a computer. The setting can be changed freely as required. The cell voltage detection terminals can be installed for each block of cells or for each of stacks if the power plant is a large-capacity one. The reaction gas feed control system should preferably be installed for each such block or stack.

When the cell voltage of a block or a stack has fallen below the setting, its reaction gas feed control system is put into operation to shut off or reduce the feed of anode fuel gas and/or cathode oxidizing gas (air or carbon dioxide gas) for a while and then restore the feed. The types of reaction gases to be reduced or shut off and the duration of reduction or shutoff can be set freely and memorized in the computer. The conditions upon which to shut off or reduce the reaction gas feed can also be set and changed arbitrarily.

Although it is practical to repeat the total shutoff or reduction of the feed of fuel gas or the carbon dioxide-laden gas carried in the oxidizing gas several times, the most effective way is to reduce or shut off the feed of fuel gas first, restore it, reduce or shut off the feed of carbon dioxide-laden gas in the oxidizing gas, restore it, reduce or shut off the feed of air, and then restore it. Determine the reaction gas by the control of which the gain of the cell voltage has been the largest, and repeat the reduction or shutoff operation of that gas until no further cell voltage improvement is achieved.

It is to be understood that the control steps above are just an example, and can be set and programmed with reference to the cell voltage gain. The duration of feed reduction or shutoff can also be set arbitrarily, but usually will be in the range of 1 to 3 minutes.

In the control operations explained above, the feed of a selected reaction gas is reduced or cut off so that it will become lower than its electrochemical equivalent, on the basis of the current passing through the cell 11.

For example, for a 40-cell block carrying 1,000 A, the electrochemical equivalent feed of fuel gas is 16.8 $Nm^3/h$ as the sum of hydrogen ($H_2$) and carbon monoxide gas (CO). In the case of oxidizing gas, the electrochemical equivalent feed of carbon dioxide gas ($CO_2$) is 16.8 $Nm^3/h$, an that of air is 40 $Nm^3/h$. The molten carbonate fuel cell power generation plant according to the present invention is provided with a control system that can control the reaction gas feeds below respective electrochemical equivalent values interlockingly with the current flowing through a fuel cell 2 in the cell block or cell stack whose cell voltage has fallen below a setting. For example, the reduction or shutoff of the fuel gas feed is carried out by the operation of the fuel gas flow control valve 24. In case the feed control setting is half the electrochemical equivalent, the feed of fuel gas to the anode of the fuel cell 11 is reduced to a half. If the feed control setting is zero, the feed of fuel gas to the anode is shut off. The excess fuel gas is bypassed through the line 25. The bypassed fuel gas is introduced into a separately installed combustion furnace, and the hot waste gas generated is supplied to the turbine generator or waste heat recovery unit 19. The bypassed fuel gas can also be introduced into the furnace of the steam reformer 10 for recovery of heat or energy. It is also possible to feed the bypassed fuel gas into a fuel gas tank for refueling the fuel cell power generation plant.

Another method of fuel gas feed control is to control the feed of LNG and steam to the steam reformer 10.

On the other hand, the reduction or shutoff control of the feed of carbon dioxide-laden gas to the cathode of the fuel cell 11 can be carried out using the combustion waste gas flow control valve 26 just the same way as with the fuel gas flow control valve 24. The excess flow of the combustion waste gas is released via the line 27. The excess gas can also be fed to the turbine generator or waste heat recovery unit 19 for the purpose of recovery of heat or energy, just as in the case of excess fuel gas. The reduction or shutoff control of the feed of air to the cathode of the fuel cell 11 can be accomplished by controlling the air flow control valve 28 just the same way as with the gases explained above.

Preferred Embodiment (5)

Figure 6:
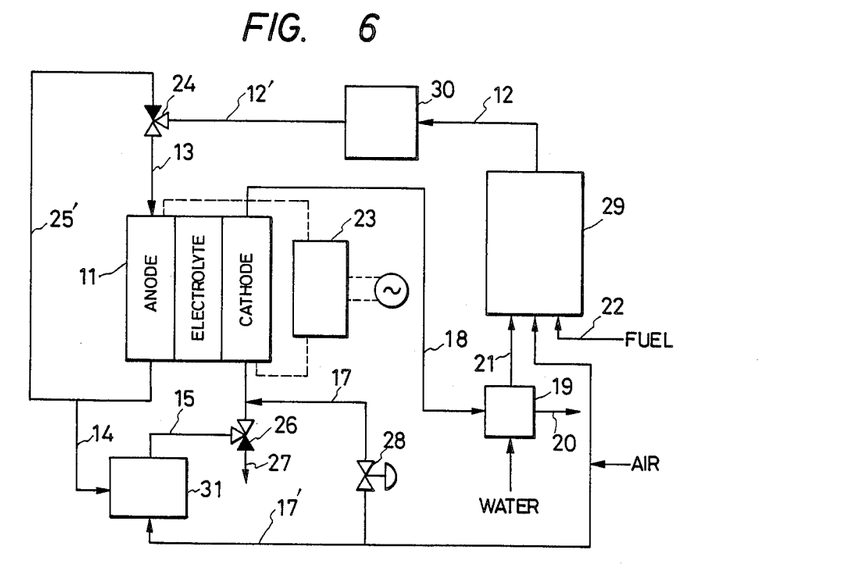
FIG. 6 is a schematic system diagram of a molten carbonate fuel cell power generation plant using a coal gasifier as a fuel gas producer. The configuration of these power plants will be detailed in the description relating to the preferred embodiment 4 of the present invention.

FIG. 6 shows a molten carbonate fuel cell power generation plant using a coal gasifier 29 as a fuel gas producer. It is just the same as the plant shown in FIG. 5, except that instead of the steam reformer 10, there are installed the coal gasifier 29, a gas refining unit 30, a combustion furnace 31 which fires anode outlet gas to feed carbon dioxide-laden gas to the cathode, and piping lines 17' and 25' for feeding air and excess fuel gas to said combustion furnace 31.

The control operation of the power generation plant illustrated in FIG. 6 is just the same as explained with reference to FIG. 5. Of course, the plant can be installed with a gas and/or steam turbine generator for an improved energy efficiency of the entire plant system.

What is claimed is:

1. A molten carbonate fuel cell which uses a molten carbonate as an electrolyte, carbonate ions as conductor carriers, hydrogen-enriched gas as a reaction gas for anode, and a mixture of air and carbon dioxide gas as a reaction gas for cathode, and which is equipped with a control system that rejuvenates the fuel cell by reducing or shutting off the feed of at least one of reaction gases below its electrochemical equivalent feed rate, on the basis of the current flowing through the fuel cell when the characteristic indicators of the fuel cell have fallen below specified limits.

2. A molten carbonate fuel cell consisting of a block of fuel cells or a stack of blocks of fuel cells, each of which uses a molten carbonate as an electrolyte, carbonate ions as conductor, hydrogen-enriched gas as a reaction gas for anode, and a mixture of air and carbon dioxide gas as a reaction gas for cathode, and each block or stack of which is equipped with a control system that rejuvenates the fuel cell block or stack by reducing or shutting off the feed of at least one of reaction gases below its electrochemical equivalent feed rate, on the basis of the current flowing through the fuel cell block or stack when the characteristic indicators of the fuel cell block or stack have fallen below specified limits.

3. A molten carbonate fuel cell consisting of a block of fuel cells or a stack of blocks of fuel cells each of which uses a molten carbonate as an electrolyte, carbonate ions as conductor, hydrogen-enriched gas as a reaction gas for anode, and a mixture of air and carbon dioxide gas as a reaction gas for cathode, and each block or stack of which is equipped with a control system that rejuvenates the fuel cell block or stack by reducing or shutting off the feed of the hydrogen-enriched gas for a while below its electrochemical equivalent feed rate, on the basis of the current flowing through the fuel cell block or stack when the characteristic indicators of the fuel cell block or stack have fallen below specified limits, while feeding the resultant excess flow of hydrogen-enriched gas to a combustion furnace whose waste gas is fed to a turbine generator or waste heat recovery unit for energy recovery.

4. A molten carbonate fuel cell consisting of a block of fuel cells or a stack of blocks of fuel cells each of which uses a molten carbonate as an electrolyte, carbonate ions as conductor, hydrogen-enriched gas as a reaction gas for anode, and a mixture of air and carbon dioxide gas as a reaction gas for cathode, and each block or stack of which is equipped with a control system that rejuvenates the fuel cell block or stack by reducing or shutting off the feed of the mixture of air and carbon dioxide gas for a while below its electrochemical equivalent feed rate of the current flowing through the fuel cell block or stack have fallen below specified limits, while feeding the resultant excess flow of the mixture gas to a turbine generator or waste heat recovery unit for energy recovery.

5. An operation control system for a molten carbonate fuel cell which uses a molten carbonate as an electrolyte, carbonate ions as electricity carriers, hydrogen-enriched gas as a reaction gas for anode, and a mixture of air and carbon dioxide gas as a reaction gas for cathode and which system is capable of running said fuel cell continuously by totally cutting off the feed of, or reducing the concentration of, at least one of reaction gases for a specified time after which said feed or concentration is recovered, to reactivate said fuel cell.

6. An operation control system for a block of molten carbonate fuel cells or a stack of blocks of molten fuel cells each of which uses a molten carbonate as an electrolyte, carbonate ions as electricity carriers, hydrogen-enriched gas as a reaction gas for anode, and a mixture of air and carbon dioxide gas as a reaction gas for cathode and which system is capable of running said fuel cell block or stack continuously by totally cutting off the feed of, or reducing the concentration of, at least one of reaction gases for a specified time after which said feed or concentration is recovered, to reactivate said fuel cell block or stack.

7. In the combination of a molten carbonate fuel cell according to any one of claims 1 though 4, for which at least either the voltage, power, internal resistance, reaction gas pressures or differential pressures is used as a characteristic indicator of said fuel cell.

8. In the combination of an operation control system according to either one of claims 5 and 6, for which at least either the voltage, power, internal resistance, reaction gas pressures or differential pressures is used as a characteristic indicator of said fuel cell.

* * * * *

UNITED STATES PATENT AND TRADEMARK OFFICE
Certificate

Patent No. 4,810,595                                    Patented: March 7, 1989

On petition requesting issuance of a certificate for correction of inventorship pursuant to 35 U.S.C. 256, it has been found that the above-identified patent, through error and without any deceptive intent, improperly sets forth the inventorship.

Accordingly, it is hereby certified that the correct inventorship of this patent is: Toshiki Kahara, Masato Takeuchi, Hideo Okada, Kazuo Iwamoto, Yoshio Iwase, Kouichi Mitsugi, Kamo Tomoichi.

Signed and Sealed this Eleventh Day of June, 1991.

BRIAN E. HEARN

*Supervisory Primary Examiner*
*Patent Examing Group 110*